(No Model.) 3 Sheets—Sheet 1.
F. M. SMILEY.
BAND SAW FILING MACHINE.
No. 565,575. Patented Aug. 11, 1896.
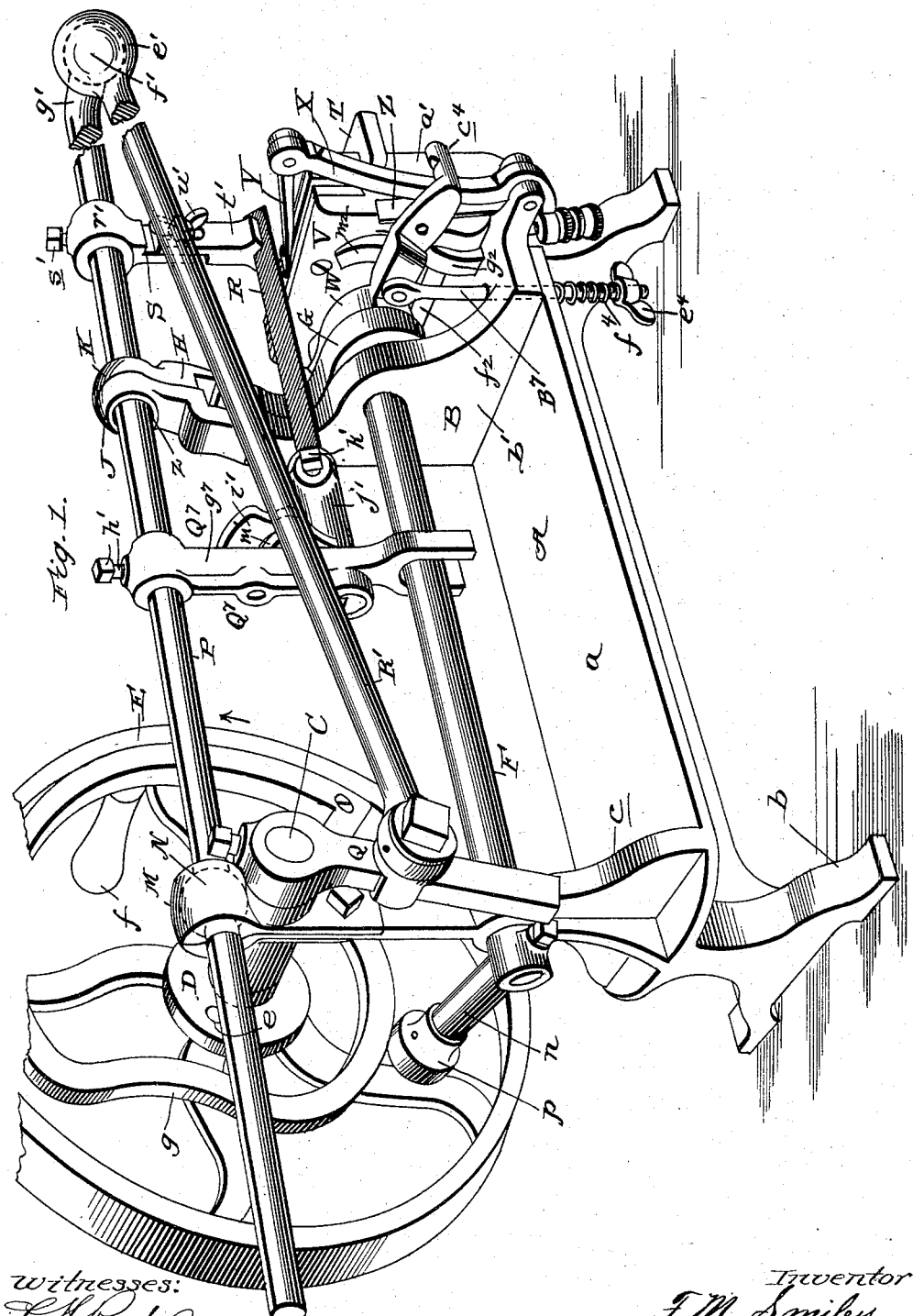

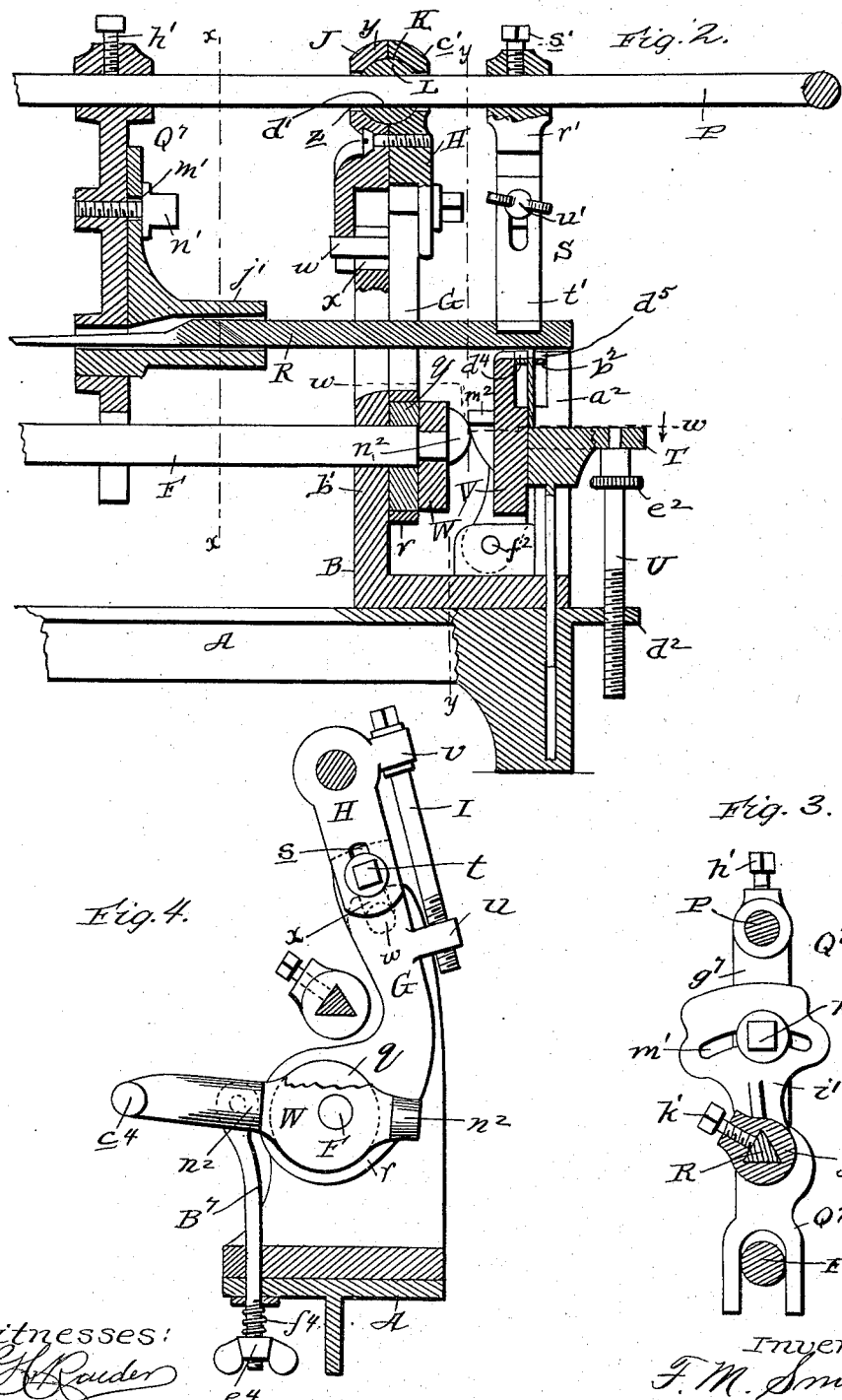

(No Model.) 3 Sheets—Sheet 3.
F. M. SMILEY.
BAND SAW FILING MACHINE.
No. 565,575. Patented Aug. 11, 1896.
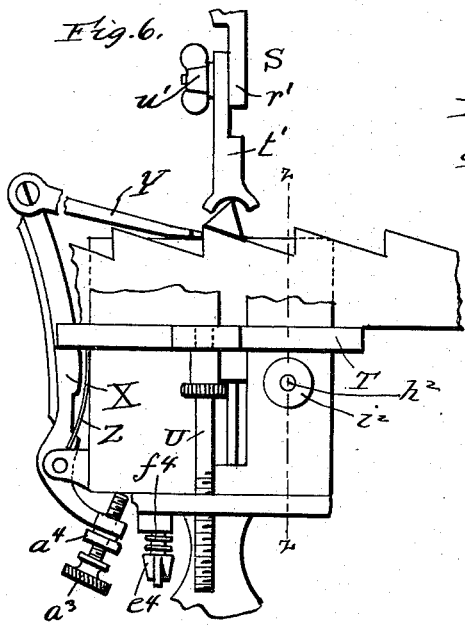
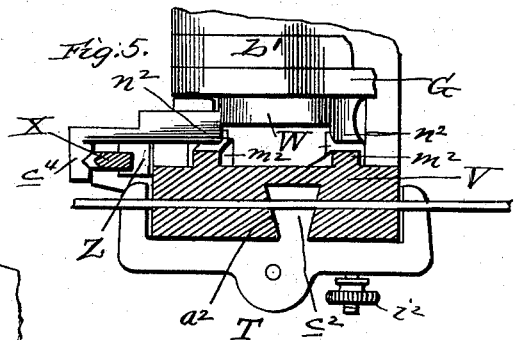
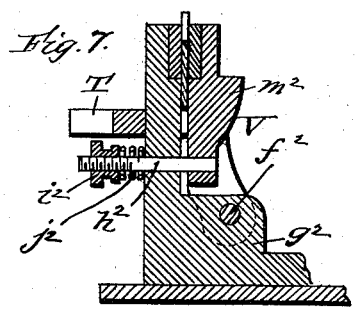
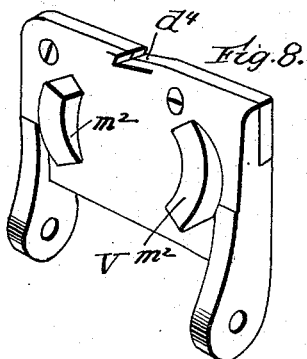
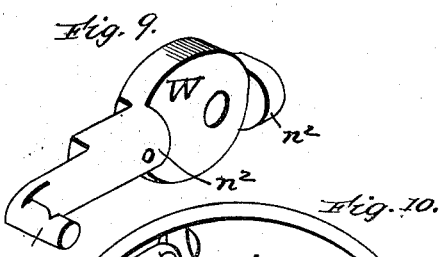
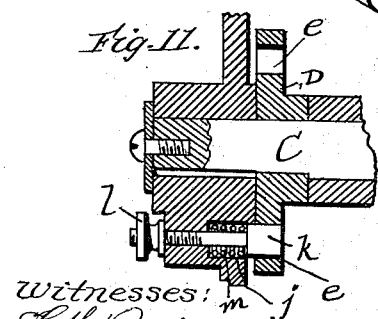
Witnesses:
Inventor
F. M. Smiley
By James J. Sheehy
Attorney

UNITED STATES PATENT OFFICE.

FRANK M. SMILEY, OF GOSHEN, INDIANA.

BAND-SAW-FILING MACHINE.

SPECIFICATION forming part of Letters Patent No. 565,575, dated August 11, 1896.

Application filed March 9, 1896. Serial No. 582,451. (No model.)

*To all whom it may concern:*

Be it known that I, FRANK M. SMILEY, a citizen of the United States, residing at Goshen, in the county of Elkhart and State of Indiana, have invented certain new and useful Improvements in Band-Saw-Filing Machines; and I do declare the following to be a full, clear, and exact description of the invention, such as will enable others skilled in the art to which it appertains to make and use the same.

My invention relates to improvements in machines for filing saws; and it has for its general object to provide such a machine designed more especially for filing band-saws, although it may be used to advantage for filing other saws and similar devices, and one embodying means for moving a file in one direction in such a position as to enable it to engage the teeth of a saw, then raising it and moving it laterally away from the saw-teeth, and then moving it in the direction opposite to that of the first-named stroke, the raising and lateral movement of the file prior to its return stroke being designed to prevent it from injuring the saw-teeth during such stroke; means for holding the saw against movement while the file is operating on the teeth thereof; means for automatically releasing the saw when the file is not operating on the teeth thereof; means for moving the saw forward when the same is released, so as to bring the teeth of the saw successively into position to be operated on by the file; means for properly holding saws of various widths and thicknesses; means whereby the operative stroke of the file, as well as the file itself, may be readily reversed, so that when all of the teeth of a saw, a band-saw for instance, have been filed on one side the other side of the teeth may be filed without removing the saw from the mechanism which holds it; and means whereby the various parts may be readily adjusted to suit various conditions and different kinds of saws.

The foregoing are the chief ends sought to be attained by my invention, but other objects and advantages will be fully understood from the following description and claims, when taken in conjunction with the accompanying drawings, in which—

Figure 1 is a perspective view of my improved machine with a portion of the drive-wheel broken away. Fig. 2 is a detail vertical longitudinal section of the front portion of the machine. Figs. 3 and 4 are detail sections taken in the planes indicated by the lines *x x* and *y y*, respectively, of Fig. 2. Fig. 5 is a detail section taken in the plane indicated by the line *w w* of Fig. 2, looking downwardly. Fig. 6 is an elevation of the front end of the machine with parts broken away. Fig. 7 is a detail section taken in the plane indicated by the line *z z* of Fig. 6. Fig. 8 is a detail perspective view of the clamp-jaw for holding the saw in position. Fig. 9 is a similar view of an arm which forms a portion of the mechanism for moving the saw and also for pressing the clamp-jaw against the same. Fig. 10 is a detail section taken at the inside of the drive-wheel, looking outwardly; and Fig. 11 is a diametrical section taken in the plane indicated by the line *v v* of Fig. 10.

In the said drawings similar letters designate corresponding parts in all of the views, referring to which—

A indicates the main frame of my improved machine. This frame A may be of any construction suitable to the purposes of my invention, but I prefer to have it comprise the bed *a*, which is provided with legs *b*, the standard *c*, which rises from the bed *a* adjacent to the rear end thereof, and the casting B, which is fixedly connected to the bed *a* and is arranged upon said bed adjacent to the forward end thereof and is provided with the uprights *a' b'*, as shown.

C indicates the drive-shaft of the machine, which is preferably arranged transversely and is journaled in a suitable bearing in the standard *c*, as shown. This shaft C is provided at one end with a fixedly-mounted disk D, which is provided at diametrically opposite points with transverse apertures *e*, and at the same end on the outside of the disk D said shaft is provided with the loosely-mounted drive-wheel E, which is shown as provided with a handle *f*, although it may be driven by a suitable motor through the medium of a band when desired. The wheel E is provided at its inner side with a cam *g*, which has the gradual enlargement or shoulder *h* and the abrupt enlargement or shoulder *i*, as shown, for a purpose presently to be described, and said wheel E is also provided with a transverse aperture j, which is enlarged at its inner end and is designed to receive the shouldered pin k, as illustrated. This pin k has its outer reduced end threaded to receive a securing-nut l, and it is designed to be pressed and held in one of the apertures e of the disk D by a spring m, as shown, so as to fix the drive-wheel E to said disk and the drive-shaft, and is also designed to be removed and inserted in the other aperture e of the disk for a purpose presently to be described.

F indicates a rock-shaft which is journaled in the standards c b' of the frame A, as illustrated in Fig. 1. This shaft F at its rear end is provided with an angular arm n, which has an antifriction-roller p, designed to engage the cam g, and at its forward end said shaft has an eccentric cam q, (see Fig. 2,) which is arranged in a strap r at the lower end of a vertically-movable bar G, whereby it will be seen that when the shaft F is rocked the bar G will be raised and lowered. At its upper end this bar G is provided with a casting H, which is preferably slotted, as indicated by s, and connected to the bar G by a screw t, taking through said slot, although it may be connected in any manner that will permit of its being raised and lowered with respect to the bar G. The raising and lowering of the casting or piece H raises and lowers the file, (presently described,) and it may be accomplished in any suitable manner. I prefer, however, to adjustably connect the casting or piece H with the bar G by a screw I, (see Fig. 4,) which is threaded to engage an interiorly-threaded lug u on the bar G and turns loosely in a lug v on casting H and is provided with collars above and below said lug v, as shown, so that when it is rotated in one direction the casting H will be raised with respect to the bar G and when it is turned in the opposite direction the casting H will be lowered. The bar G is furthermore provided, as better shown in Fig. 2, with a lateral stud or branch w. This stud or branch is arranged in a notch or slot x in the upwardly-extended portion of the upright b', and the said notch or slot is inclined toward the left-hand side of the machine, as illustrated, so as to effect the lateral movement of the file away from the saw-teeth when the bar G and the file are raised, as will be presently described.

J indicates a casting or piece which is fixedly connected to the casting H, and is preferably provided with a notch in its lower end to receive the lateral branch w of the bar G. This casting or piece J is provided with a cup-shaped portion y, which is provided with a transverse aperture z and is designed, in conjunction with a similar cup-shaped portion c' at the upper end of the casting H, to form a socket K for the reception of a ball L, which is designed to rest loosely within the socket and is provided with an aperture d', as shown. A similar socket M and ball N are provided at the upper end of the standard c, as better shown in Fig. 1 of the drawings.

P indicates a rod which is arranged in and adapted to slide through the apertures in the balls L N. This slidable rod is reciprocated from the drive-shaft C through the medium of the crank Q thereon and the pitman R', which is connected to said crank, preferably in an adjustable manner, and is provided at its forward end with a socket e', which receives a ball f' on the angular arm g' at the forward end of the rod P, as illustrated.

$Q^7$ indicates the file-holder of my improved machine. This file-holder, which is better illustrated in Fig. 3, comprises the piece $g^7$, which receives the slidable rod P and is provided with a set-screw h', and is also bifurcated at its lower end to receive the rock-shaft F, and the piece i', which is provided with a sleeve or socket j' to receive the file R and with a set-screw k' for fixing the file in said socket. The said piece i' is further provided adjacent to its upper end with a curvilinear slot m', and it is connected with the piece g' by a screw n', which takes through the slot m', whereby it will be seen that it may be adjusted and adjustably fixed to hold the sides of the file R at different angles to suit various kinds of saw-teeth.

S indicates the device which is provided for the purpose of preventing upward movement of the forward end of the file, so as to hold the same to its work. This device may be of any suitable construction, but I prefer to have it comprise the piece r', which is mounted and adjustably fixed by a screw s' on the slidable rod P, and the piece t', which is slotted and adjustably connected to the piece r' by a screw u', as shown, so as to permit of the device being suited to files of various sizes.

In virtue of the mechanism thus far described it will be seen that when the drive-wheel E is rotated in the direction of the arrow (see Fig. 1) the file R will be rapidly reciprocated, and it will also be seen that the file will be moved forwardly in such a plane as to enable it to operate on or file the teeth of a saw, and at the completion of its forward movement it will be elevated and moved laterally away from the teeth of the saw and will be retained in this position during its rearward movement, so as to prevent it from injuring the saw-teeth, which is an important desideratum. The reciprocatory movement of the file is effected by the drive-shaft C through the medium of the crank Q and the pitman R', and the movements of the parts are so timed that at the completion of the forward movement of the file the eccentric cam q will raise the bar G. This raising of the bar G and the fact that it is provided with the lateral branch w, which bears in the inclined notch or slot x of the upright b', effects the upward and lateral movement of the file away from the saw-teeth prior to the rearward movement of the file.

The upright $a'$, at the forward end of the bed $a$, is provided in its forward side with a vertical groove $a^2$, of dovetail form in cross-section, which has a portion of its upper end closed by a narrow strip $b^2$, as better shown in Fig. 2, to form a support for the saw-pushing finger, presently described. This groove $a$ is designed to receive the dovetail lug $c^2$ of the vertically-movable support T, on which the saw rests while its teeth are being filed. This support T is designed and adapted to be adjusted through the medium of the screw U, which has its lower threaded end passed through an apertured and threaded lug $d^2$ on the main frame A and its upper end journaled in the saw-support T and is provided at an intermediate point of its length with a milled wheel $e$, as shown, whereby it may be readily turned to raise or lower the support to suit the width of the saw to be filed.

V indicates the clamp-jaw, which is designed and adapted to hold a saw while the file is operating on or is in engagement with the teeth thereof. This jaw is pivotally connected by a bolt $f^2$ with lugs $g^2$ on the frame-bed $a$ at the rear side of the upright $a'$, and it is designed to be normally held against the rear side of the upright $a'$ through the medium of the bolt $h^2$, which is connected to it and extends loosely through the upright $a'$, the nut $i^2$, which is mounted on the threaded end of said bolt, and the coiled spring $j^2$, which is interposed between the nut and the upright $a'$, as shown. Said jaw V is also provided upon its rear side, as better shown in Figs. 1, 7, and 8, with the oppositely-inclined lugs $m^2$, which are designed to be engaged by the cams $n^2$ of the arm W, (see Fig. 9,) which is fixed on the forward end of the rock-shaft F, as better shown in Fig. 2 of the drawings. In virtue of this construction it will be seen that when the movements of the parts are properly timed the cams $n^2$ of the arm W will bear against the thickest parts of the lugs $m^2$ during the forward stroke of the file, when the rock-shaft F is at rest, and will hold the clamping-jaw V against rearward movement, so as to enable it to secure the saw against movement, and it will also be seen that as soon as the arm $n$ of the shaft F is engaged by the shoulder $h$ of the cam $g$, and said shaft F is rocked, the cams $n^2$ will be moved out of engagement with the lugs $m^2$, so as to permit the clamping-jaw V to swing or give rearwardly to permit of the saw being moved forwardly.

The saw is moved forwardly after each forward stroke of the file R, so as to bring the teeth in succession into the path of the file, by the lever X and the pushing-finger Y, which is loosely connected to the lever at the upper end thereof and is designed to engage the ends of the saw-teeth, as better shown in Fig. 6, so as to push the saw along. The lever X is fulcrumed adjacent to its lower end on the main frame A and is provided at its lower end with a threaded aperture to receive a screw $a^3$. This screw is designed to strike against the under side of the casting B, and thereby limit the rearward movement of the upper end of the lever, and it is provided with a check-nut $a^4$, as shown, so as to lock it against casual movement when it has been properly adjusted.

The rearward movement of the upper end of the lever X is effected by the flat spring Z, which is seated at one end in a notch in the lever X and bears at its opposite end against the clamping-jaw V, and the forward movement of said upper end of the lever X is effected by the arm W, which has a branch $c^4$ at its end designed and adapted to bear against and move the upper portion of the lever forwardly when the shaft F is rocked, as presently described.

In order to limit each forward movement of the pushing-finger Y and the saw, the clamping-jaw V and the upright $a'$ are provided, as shown, at their upper edges with shoulders $d^4$ $d^5$, against which the forward end of the pushing-finger Y is designed to strike at the completion of its forward movement. The length of the stroke of the lever X, and consequently that of the finger Y, may, when desired, be increased or diminished to suit saw-teeth of different sizes by properly adjusting the screw $a^3$, before described.

In order to quickly lock the saw against movement and also to permit the finger Y to move out of the path of the file R before the same is lowered and commences its forward movement, the abrupt shoulder $i$ of the cam $g$ is provided, and a bolt $B^7$ (see Fig. 1) is connected to the arm W and extends down through the casting B and the bed of frame A, below which it is provided with the nut $e^4$ and the spring $f^4$, which is interposed between the nut and the frame-bed and is designed, when the antifriction-roller $p$ on the arm $n$ of shaft F reaches the cam-shoulder $i$, to quickly rock the said shaft F, for the purpose mentioned.

In the practical operation of the machine the saw to be filed is placed upon the support T and between the clamping-jaw V and the upright $a'$, and the said support T is raised or lowered through the medium of the screw U to suit the width of the saw. This placement of the saw is preferably effected while the file R is in its raised position and the cams of the arm W are out of engagement with the inclined lugs of the clamping-jaw V, and at its completion the machine is ready for work. The drive-wheel E is then rotated at a high rate of speed in the direction indicated by arrow in Fig. 1, when the file R will be rapidly reciprocated, its forward stroke being in such a plane as to enable it to operate on the saw-teeth, as shown in Fig. 6, and its rear stroke in a higher plane, it having between its forward and rear strokes been raised and moved laterally, as before described.

The movements of the parts are so timed that at the completion of the forward stroke of the file R the shoulder $h$ of the cam $g$ will reach the antifriction-roller on the arm $n$ of the rock-shaft F and will rock the said shaft, and consequently the arm W, in the direction indicated by arrow in Fig. 1. This will result in the cams $n^2$ of said arm W being moved out of engagement with the lugs $m^2$ of jaw V to release said jaw and in the forward end of the lever X and the finger Y, and consequently the saw, being moved forwardly, so as to bring another tooth in the path of the file. At the completion of the rearward movement of the file the abrupt shoulder $i$ of the cam $g$ will reach the roller at the end of the shaft-arm $n$. This will enable the spring $f^4$ to quickly rock the shaft F and the arm W in the direction opposite to that indicated by arrow in Fig. 1, and will result in the clamping-jaw V being locked, so as to securely hold the saw against movement, and will also result in the lever X being moved by the spring Z, so as to draw the finger Y back from the path of the file, so that said finger will not be struck by the file and will be in a position at the completion of the forward movement of the file to again engage the saw-teeth and move the saw forwardly.

When all the teeth of a saw, a band-saw for instance, have been filed on one side and it is desirable to file the other side of the teeth without removing the saw from the saw-holding mechanism, it is simply necessary to reverse the file R and then remove the pin $k$ from the aperture $e$ in disk D and the aperture $j$ in the drive-wheel E and turn said drive-wheel in the direction indicated by arrow until its said aperture $j$ comes opposite the other aperture $e$ in the disk D, and then replace the pin in the registered apertures of the wheel E and disk D. When this is done, the rearward stroke of the file R will be in a plane to enable it to engage the saw-teeth and will be its operative stroke, while the forward stroke of the file will be in a higher plane and will be the idle stroke; and in virtue of this it will be seen that the sides of the teeth opposite to the sides filed with the wheel E, in the first-named position, will be filed by the continued operation of the machine.

It will be seen that notwithstanding its many advantages my improved machine embodies but a small number of parts and is very simple and cheap.

I have in some respects specifically described the construction and relative arrangement of the parts of my improved machine, in order to impart a full, clear, and exact understanding of the same. I do not desire, however, to be understood as confining myself to such exact construction and arrangement, as such changes or modifications may be made in practice as fairly fall within the scope of my invention.

Having described my invention, what I claim, and desire to secure by Letters Patent, is—

1. A filing-machine having a reciprocatory carrier or rod, and a file-holder comprising a section connected to the carrier or rod, a second section adapted to hold a file and having a curvilinear slot, and a screw taking through the slot of the second section and into the first section and adapted to adjustably fix said second section, substantially as specified.

2. In a filing-machine, the combination of a vertically-movable bearing, an eccentric-strap connected therewith, a rock-shaft having an angular arm, an eccentric cam fixed on said shaft and arranged in the strap, a slidable rod arranged in the movable bearing, a file-holder carried by said rod, mechanism for reciprocating the slidable rod, and a rotary cam engaging the angular arm of the rock-shaft, substantially as specified.

3. In a filing-machine, the combination of a vertically-movable bearing, an eccentric-strap connected therewith, a rock-shaft having an angular arm, an eccentric cam fixed on said shaft and arranged in the strap, a slidable rod arranged in the movable bearing, a file-holder carried by said rod, a drive-shaft, mechanism intermediate of the drive-shaft and the slidable rod for reciprocating the latter, and a cam adapted to turn with the drive-shaft and engaging the angular arm of the rock-shaft, substantially as specified.

4. In a filing-machine, the combination of a main frame having a standard and also having an upright provided with an inclined notch or slot, a ball arranged in a socket on the standard, a vertically-movable bar having an eccentric-strap and also having a branch arranged in the inclined notch or slot in the upright, a ball arranged in a socket at the upper end of the vertically-movable bar, a slidable rod arranged and adapted to move in the balls, a file-holder carried by said rod, a rock-shaft having an angular arm, an eccentric cam fixed on said shaft and arranged in the strap of the vertically-movable bar, a drive-shaft, mechanism intermediate of the drive-shaft and the slidable rod for reciprocating the latter, and a cam engaging the angular arm of the rock-shaft and adapted to turn with the drive-shaft, substantially as specified.

5. In a filing-machine, the combination of a main frame having a socket, an apertured ball arranged loosely therein, a vertically-movable bearing having a socket and an apertured ball arranged loosely therein, a slidable rod extending through the balls in the sockets and carrying a file-holder, means for reciprocating the slidable rod, and means for moving the bearing vertically, substantially as specified.

6. In a filing-machine, the combination of a vertically-movable bearing, an eccentric-strap connected therewith, a rock-shaft having an angular arm, an eccentric cam fixed on said shaft and arranged in the strap, a slidable rod arranged in the movable bearing and having an angular arm provided with a ball, a file-holder carried by said rod, a drive-shaft having a crank-arm, a cam on said shaft engaging the angular arm of the rock-shaft, and a pitman connected to the crank-arm of the drive-shaft and having a socket receiving the ball of the slidable rod, substantially as specified.

7. In a filing-machine the combination of a clamp-jaw having oppositely-inclined planes or lugs upon its rear side, an arm having cams adapted to engage the inclined planes or lugs, a rock-shaft carrying said arm and having another arm, a drive-shaft and a cam on said drive-shaft engaging the latter-named arm of the rock-shaft, substantially as specified.

8. In a filing-machine the combination of a fixed clamp-jaw having oppositely-inclined planes or lugs upon its rear side, a spring-pressed bolt connecting the clamp-jaws, an arm having cams adapted to engage the inclined planes, a spring connected with said arm, a rock-shaft carrying said arm and having another arm, a drive-shaft, and a cam on said drive-shaft engaging the latter-named arm of the rock-shaft, substantially as specified.

9. In a filing-machine the combination of a frame, a fixed clamp-jaw having a dovetail groove, a movable clamp-jaw, a saw-support having a dovetail lug arranged in the groove of the fixed jaw and also having angular branches at its ends, and a screw supporting the saw-support and arranged in a threaded aperture of the frame, substantially as specified.

10. In a filing-machine, the combination of a frame, a clamp-jaw having oppositely-inclined planes or lugs, an arm having cams adapted to engage the inclined planes or lugs and also having an angular branch, a lever fulcrumed on the frame and adapted to be engaged by the branch of the arm, a saw-engaging finger connected to the lever, and a suitable means for rocking the arm, substantially as specified.

11. In a filing-machine the combination of a frame, a clamp-jaw having oppositely-inclined planes or lugs, an arm having cams adapted to engage the inclined planes or lugs and also having an angular branch, a lever fulcrumed on the frame and adapted to be engaged by the branch of the arm, a saw-engaging finger connected to the lever, a screw carried by the lever and adapted to limit the throw of the same in one direction, and a suitable means for rocking the arm, substantially as specified.

12. In a filing-machine, the combination of a frame, a vertically-movable bearing, an eccentric-strap connected with said bearing, a clamp-jaw having oppositely-inclined planes or lugs, an arm having cams adapted to engage said inclined planes or lugs, a lever adapted to be engaged by said arm and carrying a saw-engaging finger, a rock-shaft carrying the arm and having an eccentric cam arranged in the strap of the vertically-movable bearing and also having an angular arm, a drive-shaft having a crank-arm, a cam on said shaft engaging the angular arm of the rock-shaft, a slidable device arranged in the vertically-movable bearing and carrying a saw-holder, and a pitman connecting the crank-arm of the drive-shaft and said slidable device, substantially as specified.

13. In a filing-machine, the combination of a drive-shaft, a disk fixed on said shaft and having holes at diametrically opposite points, a file-holder, mechanism intermediate of the drive-shaft and the file-holder for reciprocating the latter, a drive-wheel loosely mounted on the drive-shaft, and a removable pin carried by said wheel and adapted to be inserted in either hole of the disk, substantially as and for the purpose set forth.

In testimony whereof I affix my signature in presence of two witnesses.

FRANK M. SMILEY.

Witnesses:
W. B. ROGERS,
L. BURR WHIPPY.